(12) United States Patent
Parsell, Jr.

(10) Patent No.: US 8,747,013 B2
(45) Date of Patent: Jun. 10, 2014

(54) FASTENING DEVICES

(71) Applicant: Davis Aircraft Products Co., Inc., Bohemia, NY (US)

(72) Inventor: Michael J. Parsell, Jr., Selden, NY (US)

(73) Assignee: Davis Aircraft Products Co., Inc., Bohemia, NY (US)

( * ) Notice: Subject to any disclaimer, the term of this patent is extended or adjusted under 35 U.S.C. 154(b) by 77 days.

(21) Appl. No.: 13/624,033

(22) Filed: Sep. 21, 2012

(65) Prior Publication Data

US 2014/0086677 A1     Mar. 27, 2014

(51) Int. Cl.
*F16B 17/00*     (2006.01)

(52) U.S. Cl.
USPC ........................................ 403/252; 244/17.11

(58) Field of Classification Search
USPC ................... 403/252–255, 325–327, DIG. 4; 244/17.11–17.27
See application file for complete search history.

(56) References Cited

U.S. PATENT DOCUMENTS

| | | | | |
|---|---|---|---|---|
| 2,816,471 | A * | 12/1957 | Bachman | 411/348 |
| 3,024,826 | A * | 3/1962 | Kierbow | 152/233 |
| 3,158,059 | A | 11/1964 | Myers | |
| 3,266,364 | A | 8/1966 | Becker | |
| 3,896,698 | A | 7/1975 | Aylott | |
| 3,918,130 | A | 11/1975 | Poe | |
| 4,640,572 | A * | 2/1987 | Conlon | 439/892 |
| 4,763,459 | A * | 8/1988 | Wesselski | 52/646 |
| 4,799,819 | A * | 1/1989 | Swoboda | 403/252 |
| 4,998,842 | A * | 3/1991 | Sheridan | 403/252 |
| 5,209,598 | A * | 5/1993 | Zullig | 403/255 |
| 5,439,310 | A * | 8/1995 | Evenson et al. | 403/321 |
| 5,697,727 | A * | 12/1997 | Harry | 403/325 |
| 6,176,660 | B1 | 1/2001 | Lewis et al. | |
| 6,193,261 | B1 * | 2/2001 | Hahka | 280/515 |
| 6,390,722 | B1 * | 5/2002 | Godfrey et al. | 403/322.2 |
| 7,258,316 | B2 | 8/2007 | Reeves | |
| 7,628,053 | B2 | 12/2009 | Bermudez, III | |
| 2005/0123372 | A1 | 6/2005 | Sato | |
| 2009/0028659 | A1 | 1/2009 | Shibuya | |

* cited by examiner

*Primary Examiner* — Joshua Kennedy
(74) *Attorney, Agent, or Firm* — Law Offices of Michael L. Wise, LLC

(57) ABSTRACT

Aspects of the invention are directed to a fastening device. A housing comprises a substantially planar coupling plate defining an aperture. A first engagement member passes through the aperture and defines a first arcuate surface with a first outwardly extending foot at a proximal end and a first protruding rim at a distal end. A second member is largely a mirror image of the first engagement member. A slide is adapted to be translated between a first position and a second position. When the slide is in the first position, the slide occupies a space between the first and second engagement members so that they are fixedly spaced apart. When the slide is in the second position, the first engagement member and the second engagement member are free to limitedly pivot in the housing to a condition in which the distal ends of the two engagement members meet.

16 Claims, 4 Drawing Sheets

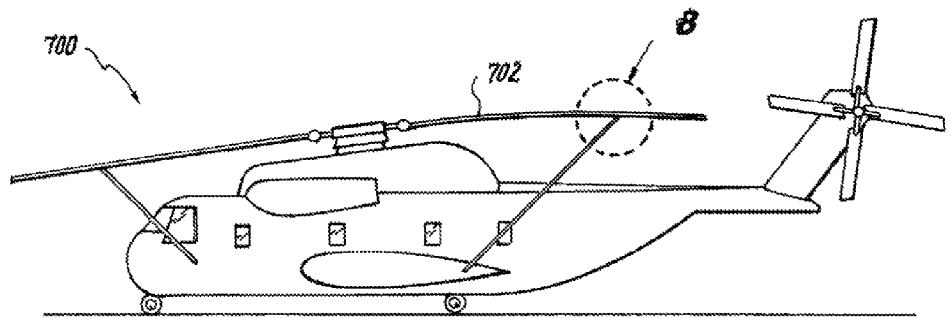
Fig. 7
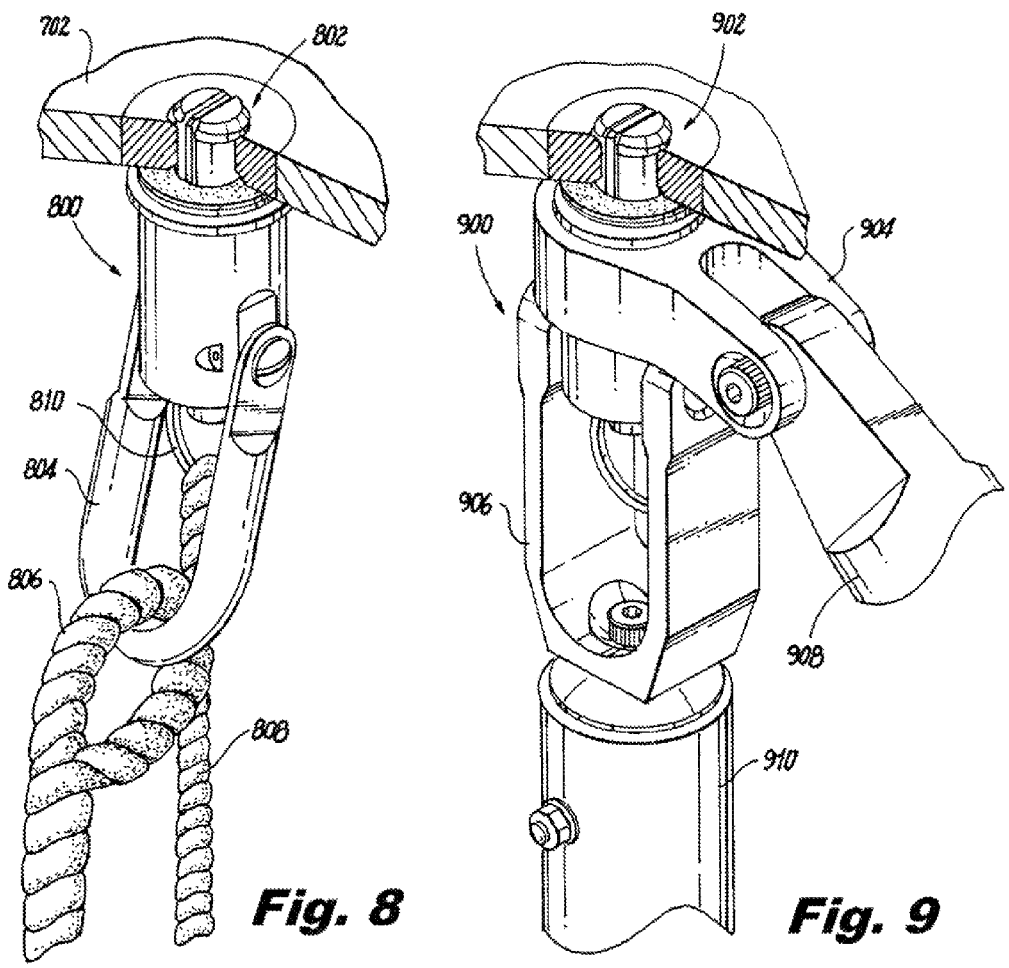
Fig. 8  Fig. 9

FASTENING DEVICES

FIELD OF THE INVENTION

The present invention relates to fastening devices capable of being removably coupled to complementary receiver sockets.

BACKGROUND OF THE INVENTION

It is frequently desirable to strap down or secure the rotor blades of a helicopter when that helicopter is not in use. Securing the rotor blades has several advantages. It protects the blades from swinging, rocking, and stretching, and thereby avoids excessive pressure on a helicopter's rotor shaft. In addition, it stops the blades from spinning in the wind and thereby reduces the chance that the blades will strike something and be damaged. Lastly, some helicopters have folding rotor blades that, when properly secured, make the helicopter substantially more compact for storage and shipment.

Many helicopters, particularly those used for military purposes, are fitted with receiver sockets built into their rotor blades and fuselages that facilitate the securing of their rotor blades. Specialized fastening devices are designed to releasably couple to these receiver sockets and, in so doing, provide fastening points on which rigid pole assemblies or flexible straps can be attached. These rigid pole assemblies and straps, in turn, can be utilized to restrict the movement of the rotor blades.

Nevertheless, despite their wide spread use, many of the fastening devices used for these applications are difficult or inconvenient to use, and/or may occasionally work loose in service. For this reason, there remains a need for alternative fastening devices that remedy these deficiencies.

SUMMARY OF THE INVENTION

Embodiments of the present invention address the above-identified needs by providing fastening devices that may be removably coupled to receiver sockets while providing superior pull-out strength, reliability, repeatability, and ease of use.

Aspects of the invention are directed to a fastening device comprising a housing, a first engagement member, a second engagement member, and a slide. The housing comprises a substantially planar coupling plate defining an aperture therein. The first engagement member passes through the aperture and defines a first arcuate surface with a first outwardly extending foot at a proximal end inside the housing and a first protruding rim at a distal end outside the housing. Similarly, the second engagement member passes through the aperture and defines a second arcuate surface with a second outwardly extending foot at a proximal end inside the housing and a second protruding rim at a distal end outside the housing. The slide is adapted to be translated between a first position and a second position. When the slide is in the first position, a spacing portion of the slide occupies a space outside the housing between the first engagement member and the second engagement member so that the first engagement member is fixedly spaced apart from the second engagement member. In contrast, when the slide is in the second position, the first engagement member and the second engagement member are free to limitedly pivot in the housing to a condition in which the distal end of the first engagement member contacts the distal end of the second engagement member.

BRIEF DESCRIPTION OF THE DRAWINGS

These and other features, aspects, and advantages of the present invention will become better understood with regard to the following description, appended claims, and accompanying drawings where:

FIG. 7 shows a side elevational view of a helicopter tie-down application in which a fastening device in accordance with aspects of the invention may be utilized;

FIG. 8 shows a partially cutaway perspective view of a fastening device and receiver socket in accordance with a second illustrative embodiment of the invention; and FIG. 9 shows a partially cutaway perspective view of a fastening device and receiver socket in accordance with a third illustrative embodiment of the invention.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

For ease of understanding, many of the elements and functions described herein will be set forth using the terms: "left," "right," "upper," "lower," "upward," and "downward." Nevertheless, the use of this directional terminology is merely for ease of description and clarity. This terminology is not intended to suggest that embodiments of the invention must take on a particular orientation when actually reduced to practice.

Aspects of the invention are directed to fastening devices operative to releasably couple to complementary receiver sockets. These fastening devices have two states: unlocked and locked. In their unlocked state, the fastening devices can be inserted and removed from their receiver sockets. In contrast, when inserted into their receiver sockets and placed into their locked states, the fastening devices cannot be removed, although rotation relative to the receiver socket is allowed in some instances.

Figure 1:
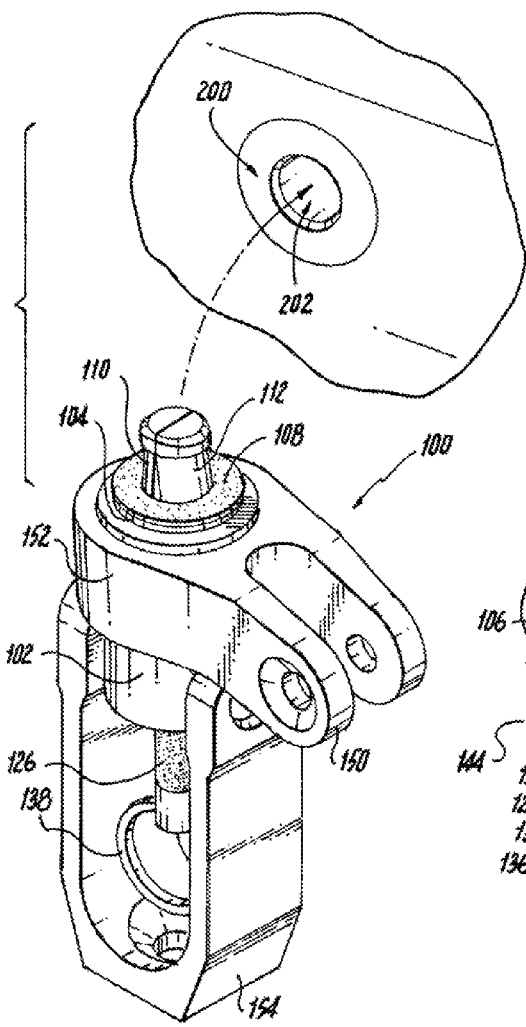
FIG. 1 shows a perspective view of a fastening device and a receiver socket in accordance with a first illustrative embodiment of the invention with the fastening device removed from the receiver socket and in its unlocked state.
Figure 2:
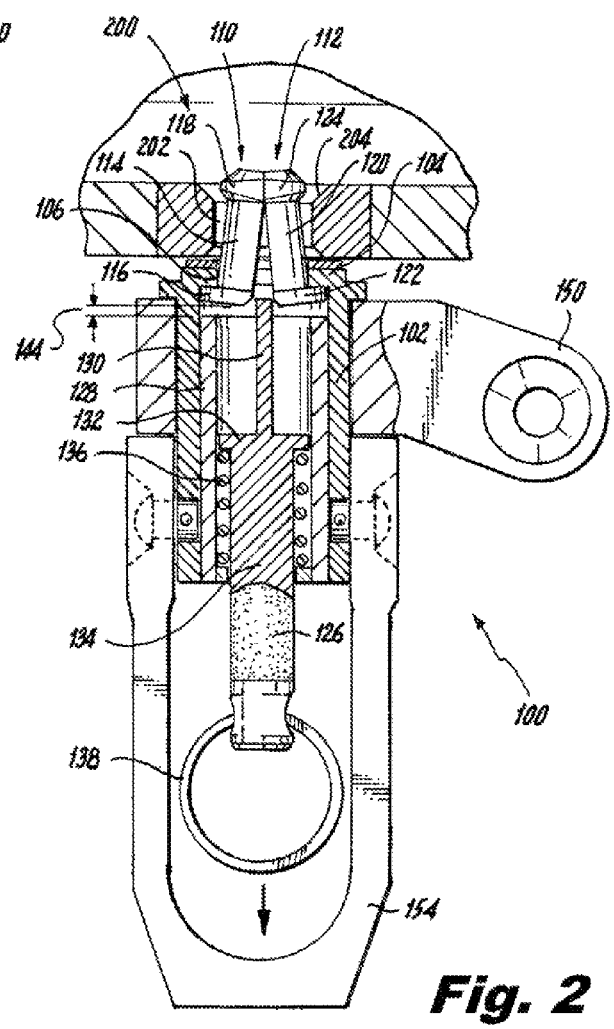
FIG. 2 shows a sectional view of the FIG. 1 fastening device and receiver socket with the fastening device inserted into the receiver socket and in its unlocked state.
Figure 3:
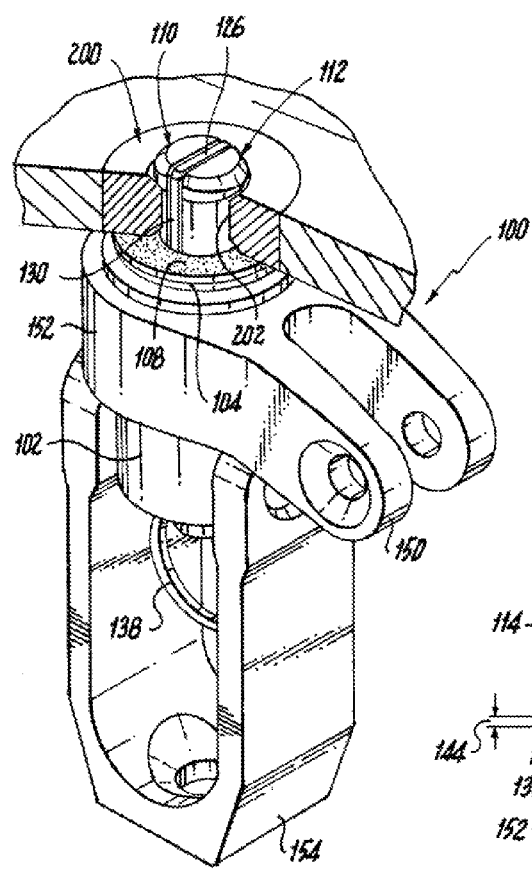
FIG. 3 shows a partially cutaway perspective view of the FIG. 1 fastening device and receiver socket with the fastening device inserted into the receiver socket and in its locked state.
Figure 4:
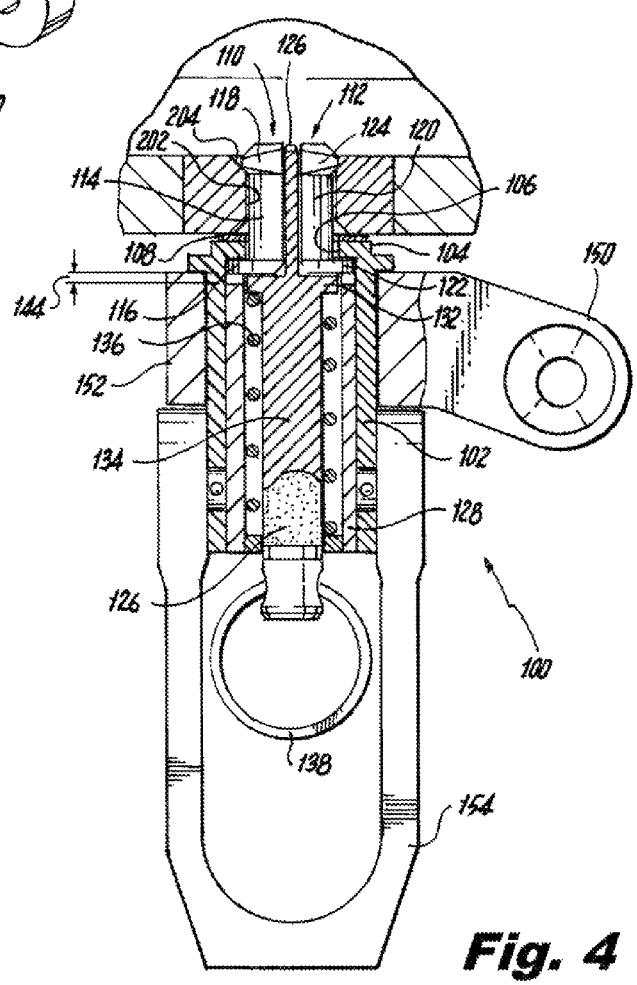
FIG. 4 shows a sectional view of the FIG. 1 fastening device and receiver socket with the fastening device inserted into the receiver socket and in its locked state.

FIGS. 1-4 start by showing various views of one such fastening device 100 and its receiver socket 200 in accordance with a first illustrative embodiment of the invention. FIG. 1 shows a perspective view of the fastening device 100 and the receiver socket 200 with the fastening device 100 removed from the receiver socket 200 and in its unlocked state. FIG. 2, in turn, shows a sectional view of the fastening device 100 and the receiver socket 200 with the fastening device 100 inserted into the receiver socket 200 and in its unlocked state. FIG. 3 shows a partially cutaway perspective view of the fastening device 100 and the receiver socket 200 with the fastening device 100 inserted into the receiver socket 200 and in its locked state. Finally, FIG. 4 shows a sectional view of the fastening device 100 and the receiver socket 200 with the fastening device 100 inserted into the receiver socket 200 and in its locked state.

As will be observed in FIGS. 1-4, the fastening device 100 comprises a housing 102 with a planar coupling plate 104 that defines a circular aperture 106 therein. The coupling plate 104, in turn, is topped by an annular rubber pad 108. A left engagement member 110 and a right engagement member 112 pass through the circular aperture 106 and the annular rubber pad 108, thereby placing a respective portion of each of the engagement members 110, 112 inside the housing 102 and a respective portion of each of the engagement member 110, 112 outside the housing 102. The left engagement member 110 defines a left arcuate surface 114 with a left outwardly extending foot 116 at a proximal end (inside the housing 102) and a left protruding rim 118 at a distal end (outside the housing 102). The portion of the left engagement member 110 between the left outwardly extending foot 116 and the left protruding rim 118 substantially describes a circular segment when considered in cross-section in a plane parallel to the coupling plate 104. The right engagement member 112 is largely just a mirror image of the left engagement member 110. The right engagement member 112 defines a right arcuate surface 120 with a right outwardly extending foot 122 at a proximal end and a right protruding rim 124 at a distal end.

The locking and unlocking of the fastening device 100 are accomplished via a slide 126, which is housed in a hollow cylindrical slide sub-housing 128. The slide 126 itself can be conceptually separated into three portions: a spacing portion 130, a pressing portion 132, and an extension portion 134. In the present embodiment, the spacing portion 130 has a substantially rectangular cross-section in a plane parallel to the coupling plate 104, while the pressing portion 132 has a substantially circular cross-section in a plane parallel to the coupling plate 104. The slide 126 can be translated between a downward position (unlocked position; FIGS. 1 and 2) and an upward position (locked position; FIGS. 3 and 4). To assure that the fastening device 100 remains in a locked state when so placed and does not accidentally return to an unlocked state, an elastic member biases the slide 126 towards the locked position. This gives the fastening device 100 a "normally locked" characteristic. In the present embodiment, the elastic member is a spring 136 adapted to push the slide 126 upward, but any other suitable elastic device may be utilized (e.g., rubber band). Actuation of the slide 126 is facilitated by the extension portion 134, which exits the housing 102 from an aperture in the housing 102 opposite to the coupling plate 104. In the present embodiment, a ring 138 is threaded through a hole in the extension portion 134 outside the housing 102. The ring 138 allows a user to obtain a firm purchase on the slide 126 so that the user can actuate the slide 126 easily when installing and removing the fastening device 100 from the receiver socket 200.

When the slide 126 is in the locked position (FIGS. 3 and 4), the spacing portion 130 of the slide 126 occupies a space outside the housing 102 and between the left engagement member 110 and the right engagement member 112. At the same time, inside the housing 102, the pressing portion 132 of the slide 126 contacts and presses the left outwardly extending foot 116 and the right outwardly extending foot 122 against the coupling plate 104. In so doing, the left engagement member 110 is caused to be fixedly spaced apart from the right engagement member 112. In other words, with the slide in the locked position, the two engagement members 110, 112 cannot pivot or translate towards one another, but, instead, must maintain substantially erect orientations apart from each other. In contrast, when the slide 126 is in its unlocked position (FIGS. 1 and 2), the spacing portion 130 of the slide 126 does not occupy the space between the left and right engagement members 110, 112, and the pressing portion 132 releases its pressing force on the left and right outwardly extending feet 116, 122. As a result, the left and right engagement members 110, 112 become somewhat "loose" in a small gap 144 in the housing 102. The left and right engagement members 110, 112 are thereby free to limitedly pivot in the housing 102. Because of this limited pivoting, the left engagement portion 110 and the right engagement member 112 can achieve a condition in which the distal end of the left engagement member 110 contacts the distal end of the right engagement member 112. Such a state is clearly shown in FIGS. 1 and 2.

The fastening device 100 and the receiver socket 200 of the present embodiment cooperate to facilitate the releasable coupling therebetween. The receiver socket 200 comprises a hollow, substantially cylindrical passage 202 with an outwardly beveled rim 204. When the fastening device 100 is unlocked (FIGS. 1 and 2), the distal end of the left engagement member 110 and the distal end of the right engagement member 112 are free to pivot so as to contact each other and thereby become compact enough to allow them to be easily slid into and out of the hollow cylindrical passage 202. In contrast, with the left engagement member 110 and the right engagement member 112 fully inserted into the receiver socket 200 and the slide 126 placed into the locked position (FIGS. 3 and 4), the left and right engagement members 110, 112 are forced apart. The left protruding rim 118 of the left engagement member 110 and the right protruding rim 124 of the right engagement member 112 are caused to occupy a region proximate to the outwardly beveled rim 204 of the receiver socket 200. This expanded positioning of the left and right engagement members 110, 112 mechanically inhibits the left and right engagement members 110, 112 from sliding in the hollow cylindrical passage 202 of the receiver socket 200. In other words, the fastening device 100 is locked into the receiver socket 200. In so doing, the two engagement members 110, 112 supply a superior pull-out strength. In such a state, the slide 126 must again be moved to the unlocked position (against the spring 136) before the fastening device 100 can be removed from the receiver socket 200.

Additional features of the fastening device 100 both facilitate and enhance the just-described functionality. The left protruding rim 118 of the left engagement member 110 and the right protruding rim 124 of the right engagement member 112, for example, each describe angled surfaces that help to pivot and align the engagement members 110, 112 during insertion and removal from the receiver socket 200. Upward-facing surfaces of the left and right protruding rims 118, 124 are contoured so that forces directed onto the upward-facing surfaces normal to and towards the coupling plate 104 urge the engagement members 110, 112 to pivot towards each other. In a similar manner, downward-facing surfaces of the left and right protruding rims 118, 124 perform the same function with respect to forces directed onto these downward-facing surfaces normal to and away from the coupling plate 104. Accordingly, when inserting the engagement members 110, 112 into the receiver socket 200 (with the slide 126 in the unlocked position), any contact between the protruding rims 118, 124 and the receiver socket 200 helps to pivot the left and right engagement members 110, 112 towards each other so that they can become compact enough to allow them to be easily slid into the hollow cylindrical passage 202 of the receiver socket 200. When releasing the fastening device 100 from the receiver socket 200 (with the slide 126 moved to the unlocked position), contact between the left and right protruding rims 118, 124 and the outwardly beveled rim 204 of the receiver socket 200 also produces the same effect. Inserting and removing the unlocked fastening device 100 from the receiver socket 200 is thereby made easier and hang-ups are avoided.

The fastening device 100 comprises two attachments that allow the fastening device 100 to be coupled to other elements (e.g., ropes and rigid poles). More particularly, in the present embodiment, the fastening device 100 comprises a clevis 150 with a collar 152, and a yoke 154, both coupled to the housing 102. That said, one having ordinary skill in the art will recognize from the teachings contained herein that a wide variety of different attachments (e.g., fixed connections, swivels, quick disconnects) can be added to the fastening device 100. These attachments are largely independent of the locking/unlocking functions of the fastening device 100 itself.

Figure 5:
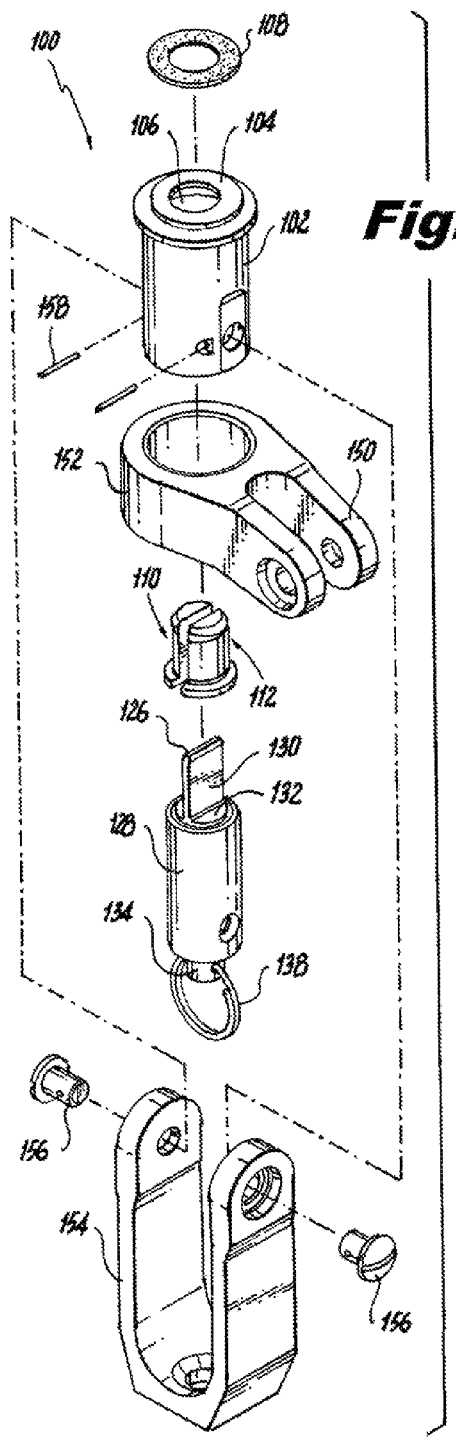
FIG. 5 shows an exploded perspective view of the FIG. 1 fastening device.
Figure 6:
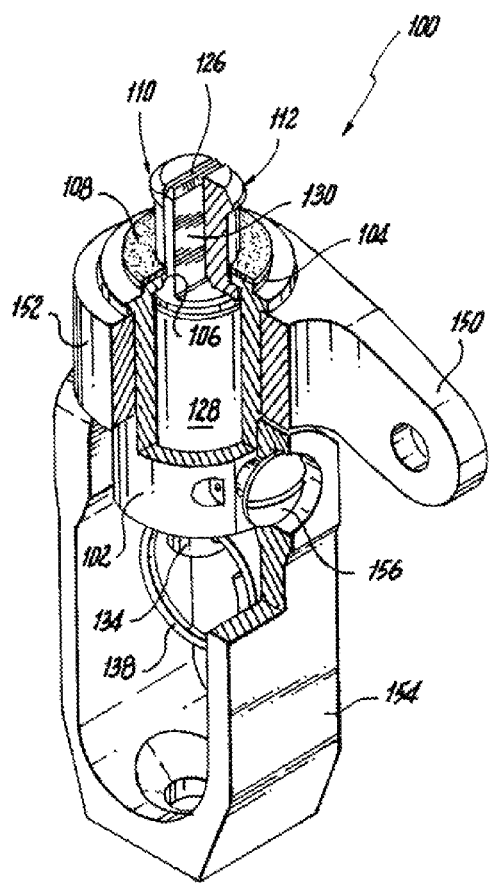
FIG. 6 shows a partially cutaway perspective view of the FIG. 1 fastening device.

FIG. 5 shows an exploded view of the fastening device 100 that helps to elucidate an exemplary manner in which the device can be constructed. In the exploded view, the annular rubber pad 108, the housing 102, the clevis 150, the left and right engagement members 110, 112, the slide sub-housing 128, and the yoke 154 are all clearly apparent (from top to bottom) as distinct elements. These elements can be formed of, for example, metal, plastic, or a combination thereof. With these components in hand, formation of the fastening device 100 can be performed by placing the collar 152 of the clevis 150 around the housing 102, and then inserting the left and right engagement members 110, 112 as well as the the slide sub-housing 128 into the housing 102. The yoke 154 can then be placed about the lower region of the housing 102 and two swivel pins 156 inserted into the housing 102 in order to secure the above-described elements in place. Two spring pins 158 can then be inserted through the housing 102 and the swivel pins 156 to keep the swivel pins 156 fixed. Lastly, the annular rubber pad 108 can be attached to the top of the coupling plate 104 utilizing an adhesive. The annular rubber pad 108 helps to prevent the fastening device 100 from scratching the apparatus to which the fastening device 100 is being coupled. FIG. 6 shows a partially cutaway sectional view of the fastening device 100 assembled in this manner. Here, the fastening device is shown in its locked state.

The fastening device 100, and, more generally, fastening devices in accordance with aspects of the invention, can be used for a wide variety of applications. One non-limiting example of an application is the securing of rotor blades on a helicopter. In fact, many existing helicopters already include receiver sockets compatible with fastening devices in accordance with aspects of the invention (sometimes referred to as "Norco" fittings). It is stressed, however, that this is only one application of many for which embodiments of the invention would be well suited.

FIG. 7 shows a side view of a helicopter 700 with a blade 702 that is secured (i.e., tied down) using a fastening device 800. FIG. 8, in turn, shows a close up, partially cutaway perspective view of the fastening device 800, which is configured in accordance with a second illustrative embodiment of the invention. The fastening device 800 is installed into a receiver socket 802 built into the blade 702. Moreover, the fastening device 800 comprises a yoke 804, around which is fixed a left rope 806. The left rope 806 is used to secure the blade 702 to the fuselage of the helicopter 700. A right rope 808 is attached to a slide of the fastening device 800 via a ring 810. This right rope 808 gives a user on the ground the ability to release the fastening device 800 from the blade 702 without requiring the use of a ladder.

As indicated earlier, instead of using ropes or straps, a helicopter blade may also be secured using rigid poles. FIG. 9 shows a partially cutaway perspective view of a fastening device 900 in accordance with a third embodiment of the invention suitable for use in this application. Again, the fastening device 900 is attached to a receiver socket 902 built into the blade of the helicopter. Here, however, a clevis 904 and a yoke 906 allow the fastening device 900 to be attached to an upper rigid pole 908 and a lower rigid pole 910. In this configuration, the upper rigid pole 908 is allowed to swivel in the clevis 904.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art from the teachings provided herein.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A fastening device comprising:
  a housing, the housing terminating in a coupling plate defining a planar outwardly facing surface with an aperture therein;
  a first engagement member, the first engagement member passing through the aperture and defining a first arcuate surface with a first outwardly extending foot at a proximal end inside the housing and a first protruding rim at a distal end outside the housing;
  a second engagement member, the second engagement member passing through the aperture and defining a second arcuate surface with a second outwardly extending foot at a proximal end inside the housing and a second protruding rim at a distal end outside the housing;
  a slide, the slide adapted to be translated between a first position and a second position;
  wherein, when the slide is in the first position, a spacing portion of the slide occupies a space outside the housing between the first engagement member and the second engagement member so that the first engagement member is fixedly spaced apart from the second engagement member;
  wherein, when the slide is in the second position, the first engagement member and the second engagement member are free to limitedly pivot in the housing to a condition in which the distal end of the first engagement member contacts the distal end of the second engagement members;
  wherein a pressing portion of the slide presses the first outwardly extending foot and the second outwardly extending foot against the coupling plate when the slide is in the first position.

2. The fastening device of claim 1, wherein the aperture is substantially circular.

3. The fastening device of claim 1, wherein the aperture is substantially occupied by the first engagement member, the second engagement member, and the slide when the slide is in the first position.

4. The fastening device of claim 1, wherein a cross-section of the first outwardly extending foot in a plane parallel to the planar outwardly facing surface substantially describes a circular segment when the slide is in the first position.

5. The fastening device of claim 1, wherein a cross-section of a portion of the first engagement member in a plane parallel to the planar outwardly facing surface substantially describes a circular segment when the slide is in the second position.

6. The fastening device of claim 1, wherein the first protruding rim comprises a surface feature contoured such that a force directed onto the surface feature normal to and towards the coupling plate urges the first engagement member to pivot towards the second engagement member.

7. The fastening device of claim 1, wherein the first protruding rim comprises a surface feature contoured such that a force directed onto the surface feature normal to and away from the coupling plate urges the first engagement member to pivot towards the second engagement member.

8. The fastening device of claim 1, further comprising an elastic member, the elastic member adapted to bias the slide towards the first position.

9. The fastening device of claim 8, wherein the elastic member comprises a spring.

10. The fastening device of claim 1, wherein a cross-section of the pressing portion in a plane parallel to the planar outwardly facing surface is substantially circular.

11. The fastening device of claim 1, wherein a cross-section of the spacing portion in a plane parallel to the planar outwardly facing surface is substantially rectangular.

12. The fastening device of claim 1, further comprising a ring, the ring threaded through an aperture in the slide outside the housing.

13. The fastening device of claim 1, further comprising a clevis, the clevis coupled to the housing.

14. The fastening device of claim 1, further comprising a yoke, the yoke coupled to the housing.

15. The fastening device of claim 1, wherein the fastening device is operative to releasably couple to a receiver socket defining a hollow, substantially cylindrical passage.

16. The fastening device of claim 15, wherein the passage defines an outwardly beveled rim.

\* \* \* \* \*